US011737153B2

(12) United States Patent
Jones

(10) Patent No.: US 11,737,153 B2
(45) Date of Patent: Aug. 22, 2023

(54) EXTENDED FREQUENCY DIVISION DUPLEX (FDD) CARRIER-BASED IAB COVERAGE

(71) Applicant: T-Mobile USA, Inc., Bellevue, WA (US)

(72) Inventor: David Jones, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 287 days.

(21) Appl. No.: 17/073,208

(22) Filed: Oct. 16, 2020

(65) Prior Publication Data

US 2022/0124837 A1    Apr. 21, 2022

(51) Int. Cl.
| | |
|---|---|
| *H04W 76/10* | (2018.01) |
| *H04L 5/14* | (2006.01) |
| *H04W 72/04* | (2023.01) |
| *H04W 72/08* | (2009.01) |
| *H04W 72/0453* | (2023.01) |
| *H04W 72/542* | (2023.01) |

(52) U.S. Cl.
CPC ............... *H04W 76/10* (2018.02); *H04L 5/14* (2013.01); *H04W 72/0453* (2013.01); *H04W 72/542* (2023.01)

(58) Field of Classification Search
None
See application file for complete search history.

(56) References Cited

U.S. PATENT DOCUMENTS

| | | | |
|---|---|---|---|
| 10,700,775 | B2 | 6/2020 | Novlan et al. |
| 2020/0044732 | A1 | 2/2020 | Cui et al. |
| 2020/0389768 | A1* | 12/2020 | Ahluwalia ........ H04M 15/8055 |
| 2021/0352643 | A1* | 11/2021 | Ahn ................... H04W 72/0446 |
| 2021/0368425 | A1* | 11/2021 | Bao ........................ H04W 48/12 |
| 2022/0109550 | A1* | 4/2022 | Bai ........................... H04L 5/16 |
| 2022/0116795 | A1* | 4/2022 | Abedini .............. H04W 72/085 |
| 2022/0182977 | A1* | 6/2022 | Miao ..................... H04L 5/0053 |

* cited by examiner

*Primary Examiner* — Saba Tsegaye
(74) *Attorney, Agent, or Firm* — Han Santos, PLLC

(57) ABSTRACT

A wireless backhaul link is established via a low-band frequency division duplex (FDD) carrier between an integrated access and backhaul (IAB) node and an IAB donor node or between the IAB node and another IAB node that is linked to the IAB donor node, in which the IAB donor node provides a backhaul connection to a core network of a wireless carrier network. Further, one or more corresponding wireless backhaul links are established between the IAB node and one or more additional IAB nodes via one or more corresponding low-band FDD carriers. When a user device is determined to be in range of the IAB node for an establishment of a wireless access link via a mid-band FDD carrier or a time division duplex (TDD) carrier, the wireless access link is established between the IAB node and the user device via the mid-band FDD carrier or the TDD carrier.

19 Claims, 5 Drawing Sheets

EXTENDED FREQUENCY DIVISION DUPLEX (FDD) CARRIER-BASED IAB COVERAGE

BACKGROUND

Integrated access and backhaul (IAB) is the concept of using a part of the wireless signal bandwidth of a one base station (gNodeB), referred to as an IAB donor node, to provide a wireless backhaul link for another base station (gNodeB), referred to as an IAB node. In other words, the radio resource of the IAB donor node is used for both radio access by mobile termination (MT) and backhaul relay between the IAB donor node and the subsequent IAB node. The other IAB node may in turn use part of its wireless signal bandwidth for the wireless backhaul link with the IAB donor node, but also for wireless backhaul link with the one or more IAB nodes that are linked to the subsequent IAB node. This form of wireless linking between IAB nodes can be repeated a number of times.

In this way, as long as the IAB donor node has a backhaul, e.g., a fiber optics cable connection, a microwave relay connection, an alternative access vendor (AAV) connection, and/or so forth to the core network of a wireless carrier network, all of the other wirelessly linked IAB nodes (IAB base stations) may "borrow" this backhaul of the IAB donor node to connect to the core network. This means that if there are sufficient wireless signal bandwidths available, new IAB base stations can be deployed in a geographical area quickly and without the costly installation of fiber optic backhaul connections to the core network for each new base station. Also, the ongoing maintenance recurring cost for such fiber optic backhaul connections can be eliminated.

In one scenario, new IAB base stations can be deployed on a temporary basis, such as to support communication during special events, to support communication during disaster recovery after a man-made or natural disaster, or to temporarily extend outdoor communication coverage to indoors. Currently, 3GPP Release 16 specifies the use of time division duplex (TDD) bands for IAB. TDD is configured to provide uplink and downlink communication within the same radio channel (frequency band). However, in instances where TDD bands are in the millimeter wave range (as is often the case in urban environments where the increased transmission bandwidth of millimeter wave radio signals is desired), the deployment of base stations using IAB may become prohibitively expensive due to the short range and low obstacle penetration ability of the millimeter wave radio signals. For example, any deployment of IAB base stations in an urban environment using millimeter wave TDD bands may require the installation of hundreds or even thousands of IAB nodes with clear line-of-sight to each other just to cover a relatively small geographical area.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
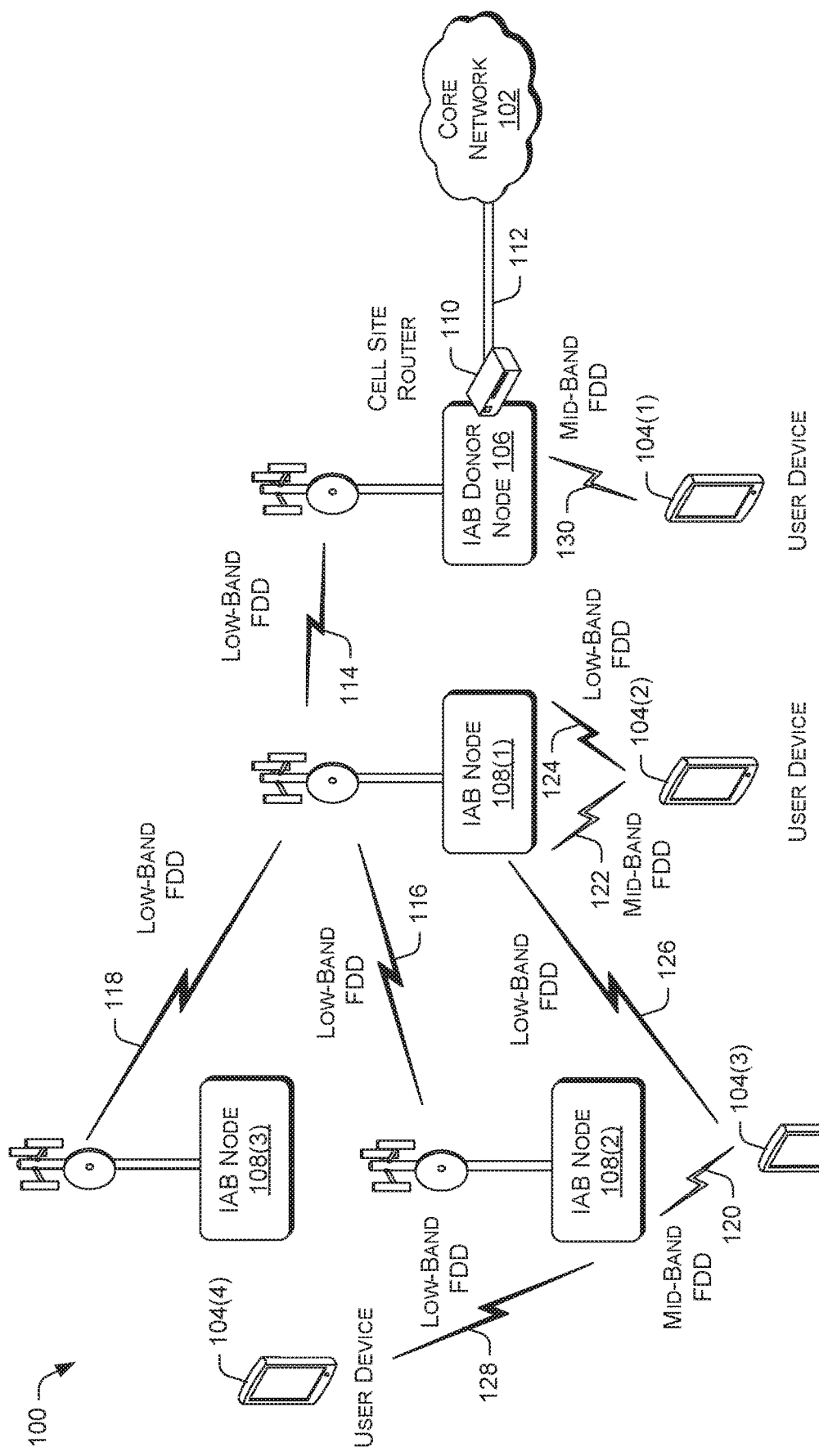
FIG. 1 illustrates an example architecture that uses frequency division duplex (FDD) carriers of different frequency bands to deploy extended integrated access and backhaul (IAB) coverage.

This disclosure is directed to using frequency division duplex (FDD) carriers or a combination of FDD carriers and TDD carriers to deploy an integrated access and backhaul (IAB) donor node and wirelessly linked IAB nodes. A carrier is a wireless communication connection that is assigned for use by a piece of equipment to communicate with another piece of equipment, in which the wireless communication connection may use one or more radio frequency blocks. Further, while TDD uses a single radio channel for both uplink and downlink communication, FDD is designed to constantly devote one radio channel (frequency band) to uplink communication and another radio channel to downlink communication.

In some embodiments, low-band FDD carriers may be used for the wireless backhaul links between an IAB donor node and one or more downstream IAB nodes. Further, each of the IAB nodes and the IAB donor node may use a low-band FDD carrier and/or a mid-band FDD carrier to establish a wireless access link between the node and a user device, such as a smartphone, an in-vehicle infotainment device, an unmanned aerial vehicle (UAV), etc. The mid-band FDD carrier may have a higher carrier wave frequency than the low-band FDD carrier. For example, the low-band may have a radio frequency of or approximately of 600 MHz, and the mid-band may have a radio frequency of or approximately of 2.1 GHz. While the low-band FDD carrier has a greater signal range than the mid-band FDD carrier, the mid-band FDD carrier has a greater transmission bandwidth than the low-frequency FDD carrier. The greater transmission bandwidth means that the mid-band FDD carrier provides a greater data throughput than the low-band FDD carrier.

Thus, if the user device is relatively close to a particular IAB node, e.g., within range of the IAB node to use either a mid-band FDD carrier or a low-band FDD carrier, the particular IAB node may use the mid-band FDD carrier for the wireless access link between the particular IAB node and the user device. Conversely, if the user device is relatively far away from the particular IAB node, e.g., only within range of the particular IAB node to use the low-band FDD carrier, the particular IAB node may use the low-band FDD carrier for the wireless access link between the IAB node and the user device.

However, in some instances, the mid-band FDD carrier may provide insufficient data transmission bandwidth for the data throughput between the particular IAB node and the user device. In such instances, the particular IAB node may coordinate for the simultaneous establishment of a new low-band FDD carrier between the user device and an in-range IAB node. For example, the in-range IAB node may be the particular IAB node, the IAB donor node, or a backhaul linked IAB node that is upstream or downstream to the particular IAB node. In some implementation, the in-range IAB node that is selected for use at any given time may be a node that is able to provide the highest low-band FDD carrier signal strength to the user device. Thus, the user device may switch between multiple in-range IAB nodes for the new low-band FDD carrier depending on the corresponding low-band FDD carrier signal strengths of the multiple in-range IAB nodes. Such carrier aggregation may provide an additional wireless access link that supplements the existing wireless access link between the particular IAB node and the user device. The user device may use the additional wireless access link provided by the low-band FDD carrier until the data throughput with respect to the user device no longer exceeds the data transmission bandwidth of the mid-band FDD carrier. As a result, carrier aggregation may be activated or deactivated based on the amount of bandwidth utilization by the user device.

Accordingly, the particular IAB node may perform carrier aggregation of the low-band and mid-band FDD carriers based on carrier availability, available data transmission bandwidths on the available carrier, bandwidth utilization by user devices, and/or so forth. However, the particular IAB node may be configured to perform carrier aggregation while preserving a sufficient amount of low-band FDD carrier bandwidth for the operation of its own wireless backhaul link and wireless backhaul links of all downstream IAB nodes, as well as prioritize the use of the low-band FDD carriers for the wireless access links of user devices that are relatively far away.

In other embodiments, FDD carriers may be used for the wireless backhaul links between an IAB donor node and one or more downstream IAB nodes. However, each of the IAB nodes and the IAB donor node may use an FDD carrier and/or a TDD carrier to establish a wireless access link between the node and a user device. For example, the FDD carrier may be a low-band FDD carrier with a radio frequency of or approximately of 600 MHz, and the TDD carrier may be a mid-band TDD carrier with a radio frequency of or approximately of 2.5 GHz. While the FDD carrier has a greater signal range than the TDD carrier, the TDD carrier has a greater transmission bandwidth than the FDD carrier. The greater transmission bandwidth means that the TDD carrier provides a greater data throughput than the FDD carrier.

Thus, if the user device is relatively close to a particular IAB node, e.g., within range of the IAB node to use either an FDD carrier or a TDD carrier, the particular IAB node may use the TDD carrier for the wireless access link between the particular IAB node and the user device. Conversely, if the user device is relatively far away from the particular IAB node, e.g., only within range of the particular IAB node to use the FDD carrier, the particular IAB node may use the FDD carrier for the wireless access link between the IAB node and the user device.

However, in some instances, the TDD carrier may provide insufficient data transmission bandwidth for the data throughput between the particular IAB node and the user device. In such instances, the particular IAB node may coordinate for the simultaneous establishment of a new FDD carrier between the user device and an in-range IAB node to provide supplemental bandwidth. For example, the in-range IAB node may be the particular IAB node, the IAB donor node, or a backhaul linked IAB node that is upstream or downstream to the particular IAB node. In some implementation, the in-range IAB node that is selected for use at any given time may be a node that is able to provide the highest FDD carrier signal strength to the user device. Thus, the user device may switch between multiple in-range IAB nodes for the new FDD carrier depending on the corresponding FDD carrier signal strengths of the multiple in-range IAB nodes. Such carrier aggregation may provide an additional wireless access link that supplements the existing wireless access link between the particular IAB node and the user device. The user device may use the additional wireless access link provided by the FDD carrier until the data throughput with respect to the user device no longer exceeds the data transmission bandwidth of the TDD carrier. As a result, carrier aggregation may be activated or deactivated based on the amount of bandwidth utilization by the user device.

Accordingly, the particular IAB node may perform carrier aggregation of the FDD and TDD carriers based on carrier availability, available data transmission bandwidths on the available carrier, bandwidth utilization by user devices, and/or so forth. However, the particular IAB node may be configured to perform carrier aggregation while preserving a sufficient amount of FDD carrier bandwidth for the operation of its own wireless backhaul link and wireless backhaul links of all downstream IAB nodes, as well as prioritizing the use of the FDD carriers for the wireless access links of user devices that are relatively far away.

The deployment of FDD carriers or a combination of FDD carriers and TDD carriers for IAB and extended wireless access coverage may be especially suited to suburban or rural areas. Since there is generally less need for capacity due to lower population density and lower wireless service usage in the suburban and rural areas, the sharing of an available frequency band for both user device access and wireless backhaul is unlikely to negatively impact user access. An example of such deployment is the deployment of IAB base stations along a highway in a rural area. An IAB donor node with a wired backhaul to the core network may be installed, then additional IAB nodes may be deployed in a chain along the rural highway, in which each of the additional IAB nodes is directly or indirectly connected via IAB to the IAB donor node. In this way, base stations can be quickly and easily deployed along the highway with relatively low cost and low complexity.

Further, while the techniques above are described above with respect to a particular IAB node that is wirelessly linked to an IAB donor node, it will be appreciated that the IAB donor may implement the techniques described above in a similar manner in other embodiments. The techniques described herein may be implemented in a number of ways. Example implementations are provided below with reference to the following FIGS. 1-5.

Example FDD Carriers Architecture

FIG. 1 illustrates an example architecture 100 that uses frequency division duplex (FDD) carriers of different frequency bands to deploy extended integrated access and backhaul (IAB) coverage. The architecture 100 may include a core network 102 that is part of a wireless carrier network operated by a mobile network operator (MNO). The wireless carrier network may further include radio access networks (RANs). Each of the RANs may be comprised of multiple base stations. Each of the base stations may provide a corresponding network cell that delivers telecommunication and data communication coverage. The core network 102 may use the network cells to provide wireless communication services to user devices. The core network 102 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 102 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 102.

Accordingly, the base stations are responsible for handling voice and data traffic between user devices and the core network 102. In some instances, the user devices may include mobile phones, tablet computers, embedded computer systems, or any other device that is capable of using the wireless communication services that are provided by the wireless carrier network. For example, the user devices may include user devices 104(1)-104(3). In some embodiments, a RAN of the wireless carrier network may include IAB base stations. For example, the RAN may include an IAB donor node 106 and IAB nodes 108(1)-108(4). The IAB donor node 106 may be equipped with a cell site router (CSR) 110 that is connected to the core network 102 via a backhaul 112. For example, the backhaul 112 may include a fiber optics cable connection, a microwave relay connection, an AAV connection, and/or so forth.

In various embodiments, low-band FDD carriers may be used for the wireless backhaul links between the IAB donor node 106 and the downstream IAB nodes 108(1)-108(3). For example, the IAB node 108(1) may be wirelessly linked to the IAB donor node 106 via a low-band FDD carrier 114. In turn, the IAB node 108(2) may be wirelessly linked to the IAB node 108(1) via a low-band FDD carrier 116, and the IAB node 108(3) may be wirelessly linked to the IAB node 108(1) via a low-band FDD carrier 118.

Further, each of the IAB nodes and the IAB donor node may use a low-band FDD carrier and/or a mid-band FDD carrier to establish a wireless access link between the node and a user device. The mid-band FDD carrier may have a higher carrier wave frequency than the low-band FDD carrier. For example, the low-band may have a frequency of or approximately of 600 MHz, while the mid-band may have a frequency of or approximately of 2.1 GHz. While the low-band FDD carrier has a greater signal range than the mid-band FDD carrier, the mid-band FDD carrier has a greater transmission bandwidth than the low-frequency FDD carrier. The greater transmission bandwidth means that the mid-band FDD carrier provides a greater data throughput than the low-band FDD carrier.

Thus, if the user device is relatively close to a particular IAB node, e.g., within range of the IAB node to use either a mid-band FDD carrier or a low-band FDD carrier, the particular IAB node may use the mid-band FDD carrier for the wireless access link between the particular IAB node and the user device. For example, the user device 104(3) is within range of the IAB node 108(2) to use either the mid-band FDD carrier or the low-band FDD carrier. In such an example, the IAB node 108(2) may use a mid-band FDD carrier 120 to establish a wireless access link between the user device 104(3) and the IAB node 108(2). The wireless access link may enable the user device 104(3) to access the wireless telecommunication services provided by the wireless carrier network.

However, in some instances, the mid-band FDD carrier may provide insufficient data transmission bandwidth for the data throughput between a particular IAB node and the user device. For example, the user device may be receiving a large amount of data via a downlink of a wireless access link and/or sending a large amount of data via an uplink of the wireless access link with the IAB node. In such instances, the particular IAB node may coordinate for the simultaneous establishment of a new low-band FDD carrier between the user device and an in-range IAB node to provide supplemental data transmission bandwidth. For example, the user device 104(2) may be wirelessly linked to the IAB node 108(1) via a mid-band FDD carrier 122 when the IAB node 108(1) detects a lack of sufficient data transmission bandwidth for the data throughput between the IAB Node 108(1) and the user device 104(2). Accordingly, the IAB node 108(1) may establish a low-band FDD carrier 124 between the IAB node 108(1) and the user device 104(2). This simultaneous use of multiple carriers is an example of carrier aggregation.

In alternative instances, the user device 104(2) may establish the low-band FDD carrier 124 with the IAB node 108(2) or the IAB donor node 106 that is in range for the establishment of the low-band FDD carrier 124. In some implementations, the in-range IAB node that is selected by the particular IAB node for use at any given time may be a node that is able to provide the highest low-band FDD carrier signal strength to the user device. For example, when the user device 104(3) is in the same situation, the user device 104(3) may establish a new low-band FDD carrier 126 with the IAB node 108(1) instead of the IAB node 108(2) due to differences in the low-band FDD carrier signal strengths provided by the IAB nodes 108(1) and 108(2). Thus, a particular IAB node may switch between multiple in-range IAB nodes depending on the corresponding low-band FDD carrier signal strengths of the multiple in-range IAB nodes. Such carrier aggregation may provide an additional wireless access link that supplements the existing wireless access link between the particular IAB node and the user device.

In some examples, a particular IAB node (e.g., IAB node 108(1)) may use the additional wireless access link provided by the low-band FDD carrier (e.g., the carrier 124) for the user device 104(2) until the data throughput no longer exceeds the data transmission bandwidth of the mid-band FDD carrier. As a result, carrier aggregation may be activated or deactivated based on the amount of bandwidth utilization by the user device.

Conversely, if the user device is relatively far away from a particular IAB node, e.g., only within range of the particular IAB node to use the low-band FDD carrier, the particular IAB node may use the low-band FDD carrier for the wireless access link between the IAB node and the user device. For example, the user device 104(4) may be within range of the IAB node 108(2) to use a low-band FDD carrier but not a mid-band FDD carrier. In such an example, the IAB node 108(2) may use a low-band FDD carrier 128 to establish a wireless access link between the user device 104(4) and the IAB node 108(2).

In the above embodiments, the preferences regarding the use of low-band FDD carriers vs. mid-band FDD carriers for wireless access links in different situations, as well as the use of carrier aggregation, are discussed in the context of the IAB nodes 108(1) and 108(2). However, the principles may be similarly applied by the IAB donor node 106 to any user device. For example, these principles may result in the user device 104(1) being linked by a mid-band FDD carrier 130 to the IAB donor node 106.

Example FDD/TDD Carriers Architecture

Figure 2:
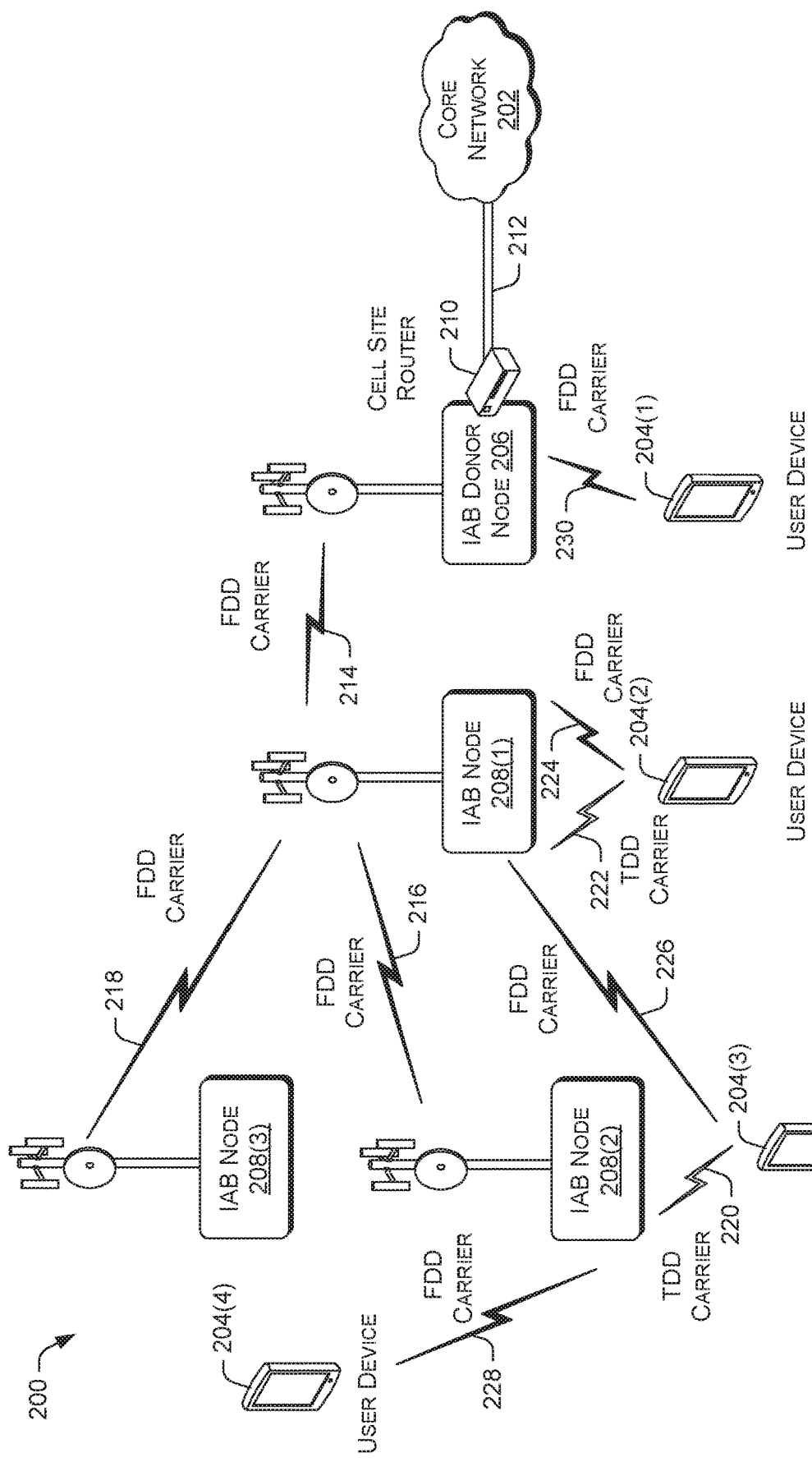
FIG. 2 illustrates an example architecture that uses a combination of time division duplex (TDD) carriers and FDD carriers of different frequency bands to deploy extended IAB coverage.

FIG. 2 illustrates an example architecture 200 that uses a combination of time division duplex (TDD) carriers and FDD carriers of different frequency bands to deploy extended IAB coverage. The architecture 200 may include a core network 202 that is identical to the core network 102 described in FIG. 1. The core network 202 may use the network cells of RANs to provide wireless communication services to user devices, such as the user devices 204(1)-204(4) that are similar to the user devices 104(1)-104(4) of FIG. 1. In some embodiments, a RAN of the wireless carrier network may include IAB base stations. For example, the RAN may include an IAB donor node 206 and IAB nodes 208(1)-208(4). The IAB donor node 206 may be equipped with a CSR 210 that is connected to the core network 202 via a backhaul 212. For example, the backhaul 212 may include a fiber optics cable connection, a microwave relay connection, an AAV connection, and/or so forth.

In various embodiments, FDD carriers may be used for the wireless backhaul links between the IAB donor node 206 and the downstream IAB nodes 208(1)-208(3). For example, the IAB node 208(1) may be wirelessly linked to the IAB donor node 206 via an FDD carrier 214. In turn, the IAB node 208(2) may be wirelessly linked to the IAB node 208(1) via an FDD carrier 216, and the IAB node 208(3) may be wirelessly linked to the IAB node 208(1) via an FDD carrier 218.

Further, each of the IAB nodes and the IAB donor node may use an FDD carrier and/or a TDD carrier to establish a wireless access link between the node and a user device. In some embodiments, the FDD carriers may be low-band FDD or mid-band FDD carriers, and the TDD carriers may be mid-band FDD carriers, in which each of the TDD carriers has a higher carrier wave frequency than each of the FDD carriers. For example, the low-band FDD carriers may have a radio frequency of or approximately of 600 MHz, the mid-band FDD carriers may have a radio frequency of or approximately of 2.1 GHz, and the TDD carriers may have a radio frequency of or approximately of 2.5 GHz. Thus, while an FDD carrier has a greater signal range than a TDD carrier, the TDD carrier has a greater transmission bandwidth than the FDD carrier. The greater transmission bandwidth means that the TDD carrier provides a greater data throughput than the FDD carrier.

Thus, if the user device is relatively close to a particular IAB node, e.g., within range of the IAB node to use either an FDD carrier or a TDD carrier, the particular IAB node may use the TDD carrier for the wireless access link between the particular IAB node and the user device. For example, the user device 204(3) is within range of the IAB node 208(2) to use either the TDD carrier or the FDD carrier. In such an example, the IAB node 208(2) may use a TDD carrier 220 to establish a wireless access link between the user device 204(3) and the IAB node 208(2). The wireless access link may enable the user device 204(3) to access the wireless telecommunication services provided by the wireless carrier network.

However, in some instances, the TDD carrier may provide insufficient data transmission bandwidth for the data throughput between a particular IAB node and the user device. For example, the user device may be receiving a large amount of data via a downlink of a wireless access link and/or sending a large amount of data via an uplink of the wireless access link with the IAB node. In such instances, the particular IAB node may coordinate for the simultaneous establishment of an FDD carrier between the user device and an in-range IAB node to provide supplemental data transmission bandwidth. For example, the user device 204(2) may be wirelessly linked to the IAB node 208(1) via a TDD carrier 222 when the IAB node 208(1) detects a lack of sufficient data transmission bandwidth for the data throughput between the IAB Node 208(1) and the user device 204(2). Accordingly, the IAB node 208(1) may establish an FDD carrier 224 between the IAB node 208(1) and the user device 204(2). This simultaneous use of multiple carriers is an example of carrier aggregation.

In alternative instances, the user device 204(2) may establish the FDD carrier 224 with the IAB node 208(2) or the IAB donor node 206 that is in range for the establishment of the FDD carrier 224. In some implementations, the in-range IAB node that is selected by the particular IAB node for use at any given time may be a node that is able to provide the highest FDD carrier signal strength to the user device. For example, when the user device 204(3) is in the same situation, the user device 204(3) may establish a new TDD carrier 226 with the IAB node 208(1) instead of the IAB node 208(2) due to differences in the FDD carrier signal strengths provided by the IAB nodes 208(1) and 208(2). Thus, a particular IAB node may switch between multiple in-range IAB nodes depending on the corresponding FDD carrier signal strengths of the multiple in-range IAB nodes. Such carrier aggregation may provide an additional wireless access link that supplements the existing wireless access link between the particular IAB node and the user device.

In various embodiments, a particular IAB node (e.g., IAB node 208(1)) may use the additional wireless access link provided by the FDD carrier (e.g., the carrier 224) for the user device 204(2) until the data throughput no longer exceeds the data transmission bandwidth of the TDD carrier. As a result, carrier aggregation may be activated or deactivated based on the amount of bandwidth utilization by the user device.

Conversely, if the user device is relatively far away from a particular IAB node, e.g., only within range of the particular IAB node to use the FDD carrier, the particular IAB node may use the FDD carrier for the wireless access link between the particular IAB node and the user device. For example, the user device 204(4) may be within range of the IAB node 208(2) to use an FDD carrier but not a TDD carrier. In such an example, the IAB node 208(2) may use an FDD carrier 228 to establish a wireless access link between the user device 204(4) and the IAB node 208(2).

In the above embodiments, the preferences regarding the use of FDD carriers vs. TDD carriers for wireless access links in different situations, as well as the use of carrier aggregation, are discussed in the context of the IAB nodes 208(1) and 208(2). However, the principles may be similarly applied by the IAB donor node 206 to any user device. For example, these principles may result in the user device 204(1) being linked by a TDD carrier 230 to the IAB donor node 206.

Example IAB Donor Node and Node Components

Figure 3:
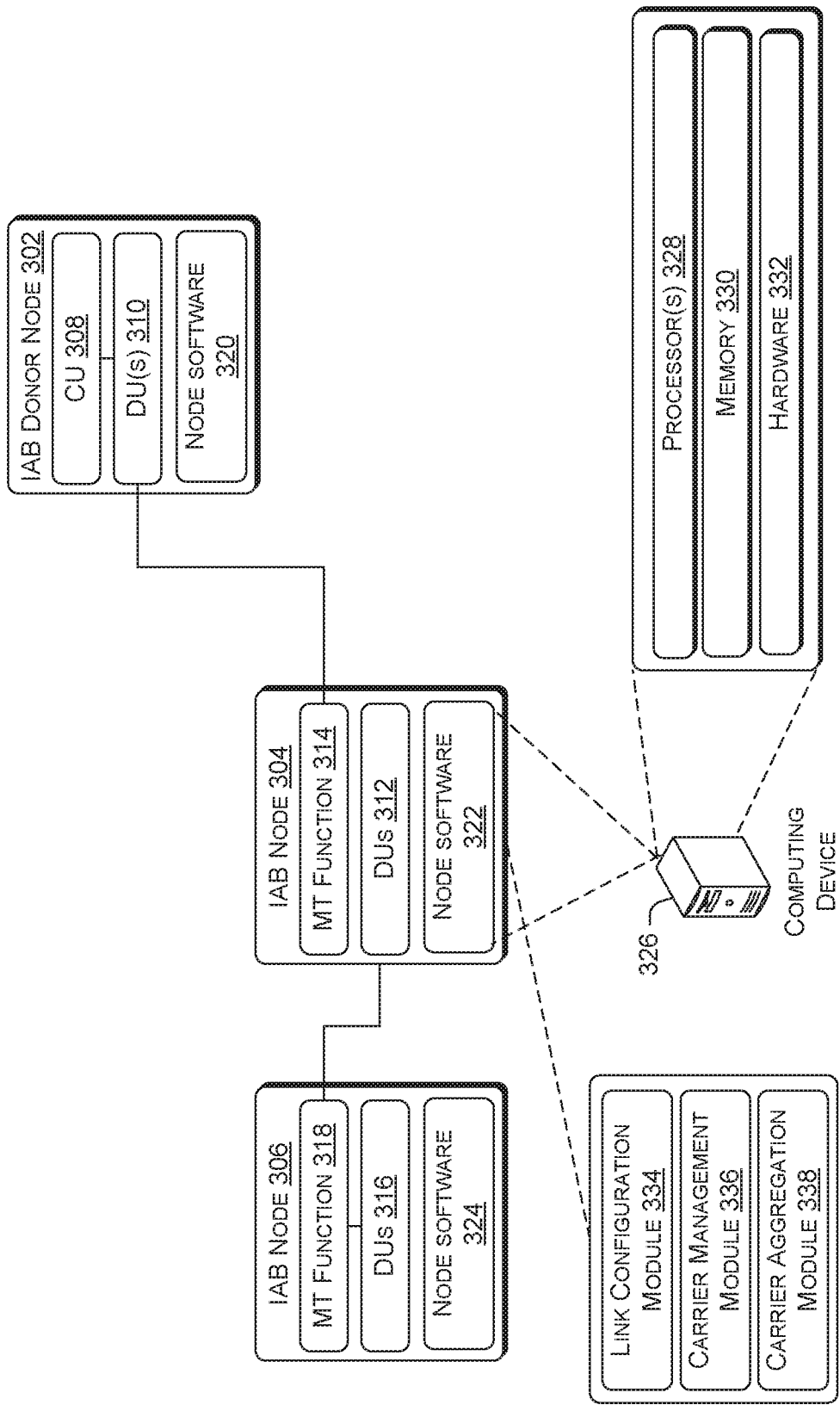
FIG. 3 is a block diagram showing various components of an IAB donor node and IAB nodes in an FDD-based IAB deployment.

FIG. 3 is a block diagram showing various components of an IAB donor node and IAB nodes in an FDD-based IAB deployment. In the illustrative IAB chain shown, the IAB donor node 302 may be linked to an IAB node 304, which in turn is linked to an IAB node 306. The IAB donor node 302 may have a split architecture that is divided between a central unit (CU) 308 and one or more distributed units (DUs) 310. The CU 308 is a logical node that hosts various control protocols to interface with the core network (e.g., the core network 102) of a wireless carrier network, as well as control the operations of the DUs 310. For example, the protocols may include the radio resource control (RRC) protocol, the service data adaption protocol (SDAP), the packet data convergence protocol (PDCP), and/or so forth. In turn, the DUs 310 may be logical nodes that are equipped with radios of multiple frequency bands that use different communication duplexing techniques (e.g., FDD, TDD, etc.) to interface with user devices. These radios may also cover different air interface sectors and/or geographical areas. For example, the DUs 310 may perform radio link control (RLC), medium access control (MAC), and/or other functions with respect to user devices. The CU 308 may interface with and control the DUs 310 via one or more F1 interfaces.

In contrast, an IAB node may be equipped with one or more DUs but lacks a CU. Instead, the IAB node may be equipped with a mobile termination (MT) function unit that is connected to its own DUs. The MT function of the IAB node may enable the IAB node to interface with a DU of an IAB node or an IAB donor node that is further up the IAB chain. For example, the IAB node 304 may include one or more DUs 312 and an MT function 314. Likewise, the IAB node 306 may include one or more DUs 316 and an MT function 318. Each IAB node may initially connect to an IAB donor node or an IAB node up the chain as a user device. Once connected, the IAB node may be configured by the IAB donor node or the IAB node up the chain to function as the next IAB link in the chain.

In various embodiments, the IAB donor and each IAB may be equipped with node software that performs various IAB and cell site functions, including the MT functions, user device connection functions, user device handover functions, etc. For example, the IAB donor node 302 may be equipped with node software 320, the IAB node 304 may be equipped with node software 322, and the IAB node 306 may be equipped with node software 324. The node software of each node may be stored in a memory of a computing device and executed by one or more processors. For the purpose of illustration, the node software 322 of the IAB node 304 is illustrated as being executed by the computing device 326. However, it will be appreciated that other IAB nodes and the IAB donor node may be equipped with similar computing devices. The computing device 326 may be a general-purpose computer, a server, or another electronic device that is capable of receiving data input, processing the data input, and generating output data. In other embodiments, the computing device 326 may be a virtual computing device in the form of a virtual machine or a software container that is hosted in a cloud.

The computing device 326 may include one or more processors 328, memory 330, and device hardware 332. The memory 330 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

As an illustrative example, the node software 322 of the IAB node 304 may include a link configuration module 334, a carrier management module 336, and a carrier aggregation module 338. With respect to the architecture 100, the link configuration module 334 may coordinate with the MT function of an IAB node to establish a wireless backhaul link following an initial connection. The wireless backhaul link may be configured according to a set of one or more predetermined configuration settings stored in the link configuration module 334. For example, the link configuration module 334 may coordinate with the MT function to establish a low-band FDD carrier with the IAB node.

The carrier management module 336 may coordinate the wireless access links between a user device and the IAB node. In some embodiments, the carrier management module 336 may determine whether a user device is within range to use a particular form of FDD carrier (e.g. low-band or mid-band) based on a signal strength of a radio signal received from the user device by the IAB node, such as a radio signal received on a control channel. Accordingly, if the received signal strength is above a predetermined strength threshold for the particular form of FDD carrier, the carrier management module 336 may determine that the user device is within range to use the particular form of FDD carrier.

Alternatively, the carrier management module 336 may determine whether a user device is within range based on a distance between the user device and the IAB node. For example, the carrier management module 336 may use the control channel to send a query for a geolocation (e.g., global positioning system (GPS) location) of the user device, and then compare the geolocation of the user device to a geolocation of the IAB node to determine a distance. The distance is compared by the carrier management module 336 to a predetermined distance threshold for the particular form of FDD carrier. The carrier management module 336 may determine that the user device is a within range to use the particular form of FDD carrier when the distance is within the predetermined distance threshold.

Thus, since a low-band FDD signal has a greater signal range than a mid-band FDD signal, the carrier management module 336 may initially establish a wireless access link with the user device via the low-band FDD carrier as the user device approaches the IAB node. However, as the user device moves closer and comes into range to use a mid-band FDD carrier, the carrier management module 336 may switch to using the mid-band FDD carrier for the wireless access link. Conversely, as the user device moves farther away and out of the range for the use of the mid-band FDD carrier, the carrier management module 336 may once again switch to using the low-band FDD carrier for the wireless access link.

In some embodiments, the carrier management module 336 may be configured to preserve a predetermined amount of the low-band FDD carrier bandwidth for the operations of the wireless backhaul links between the IAB node and downstream IAB nodes. Accordingly, the carrier management module 336 may suspend the establishment of any low-band FDD carriers for wireless access links between the IAB node and user devices when an available amount of low-band FDD carrier bandwidth at the IAB node falls below a minimum bandwidth threshold. The suspension of the low-band FDD carrier establishment may remain in place until the carrier management module 336 determines that the available amount of the low-band FDD carrier bandwidth is at or above the minimum bandwidth threshold.

The carrier aggregation module 338 may coordinate the use of multiple carriers by a single user device. The user device may include hardware and/software components that support the use of multiple FDD carriers of different frequencies to simultaneously carry uplink and downlink communication traffic. In various embodiments, the carrier aggregation module 338 may be configured to supplement the use of a mid-frequency FDD carrier with a low-frequency FDD carrier. For example, a user device may be using the mid-band FDD carrier as a wireless access link between the user and the IAB node. However, the mid-band FDD carrier may provide insufficient data transmission bandwidth for the data throughput between the IAB node and the user device. For example, the IAB node may determine that the mid-band FDD carrier is providing insufficient data transmission bandwidth when corresponding data of the user device overflows into an overflow buffer of the IAB node, when a data packet loss of the data for the user device exceeds a predetermined loss threshold at the IAB node, when data transmission latency of the data for the user device exceeds a latency threshold, and/or so forth. In such instances, the IAB node may coordinate the establishment of a new low-band FDD carrier between the user device and an in-range IAB node to provide supplemental data transmission bandwidth.

The in-range IAB node may be a node that is able to provide the highest low-band FDD carrier signal strength to the user device. For example, the in-range IAB node may be the IAB node, the IAB donor node, or a backhaul linked IAB node that is upstream or downstream to the in-range IAB node. In various embodiments, the in-range IAB node that is able to provide the highest low-band FDD carrier signal strength may be an in-range IAB that is receiving a strongest radio signal from the user device or which is closest in distance to the user device.

In some embodiments, the provision of the low-band FDD carrier from an in-range IAB node may be subject to the preservation of a predetermined amount of the low-band FDD carrier bandwidth and prioritization of the allocation of low-band FDD carriers for wireless access links of user devices that are within range but otherwise do not have any wireless access link to an in-range IAB node. Thus, the carrier aggregation module 338 may coordinate for the termination of a supplemental low-band FDD carrier in certain situations. For example, when an amount of available low-band FDD carrier bandwidth is below a minimum bandwidth threshold of the in-range IAB node, the termination may free up sufficient low-band FDD carrier bandwidth so that a new low-band FDD carrier may be established between the in-range IAB node and a user device that is within range but otherwise does not have a wireless access link to an in-range IAB node. This means that the carrier aggregation module 338 may use carrier aggregation to establish or maintain the supplemental wireless access link only when there is sufficient low-band FDD carrier bandwidth at the IAB node for supporting at least a portion of the data throughput of the user device, in addition to supporting existing data traffic on a wireless backhaul link to an upstream IAB node or IAB donor node, and if applicable, on the one or more wireless backhaul links to one or more downstream IAB nodes, and on one or more other wireless access links that the IAB node has with one or more other user devices.

In instances in which the in-range IAB node that provides a low-band FDD carrier is an IAB donor node, a downstream IAB, or an upstream IAB node rather than the IAB node itself, the carrier aggregation module 338 of the IAB node may coordinate with carrier aggregation modules of the in-range IAB to set up a supplemental low-band FDD carrier. The coordination may be performed in a peer-to-peer manner via control channel communication (e.g., RLC channel) between the nodes. Alternatively, the coordination may be performed by the IAB node in conjunction with a network switching function of a core network. The coordination performed by the carrier aggregation module 338 may further include the synchronization of multiple FDD carriers to duplex uplink and downlink communication traffic between a user device and one or more IAB nodes. For example, a carrier traffic synchronization algorithm of the carrier aggregation module 338 may work in conjunction with a counterpart synchronization algorithm on a user device, and/or synchronization algorithms of one or more additional IAB nodes to perform the duplexing. While the operations of the modules are described above in the context of the IAB node 304, it will be appreciated that the node software of the example IAB donor node 302 and the example IAB node 306 may function in a similar manner.

With respect to the architecture 200, the link configuration module 334 may coordinate with the MT function of an IAB node to establish a wireless backhaul link following an initial connection. The wireless backhaul link may be configured according to a set of one or more predetermined configuration settings stored in the link configuration module 334. For example, the link configuration module 334 may coordinate with the MT function to establish an FDD carrier with the IAB node.

The carrier management module 336 may coordinate the wireless access links between a user device and the IAB node. In some embodiments, the carrier management module 336 may determine whether a user device is within range to use a particular form of carrier (e.g. FDD carrier or TDD carrier) based on a signal strength of a radio signal received from the user device by the IAB node, such as a radio signal received on a control channel. Accordingly, if the received signal strength is above a predetermined strength threshold for the particular form of carrier, the carrier management module 336 may determine that the user device is within range to use the particular form of carrier.

Alternatively, the carrier management module 336 may determine whether a user device is within range based on a distance between the user device and the IAB node. For example, the carrier management module 336 may use the control channel to send a query for a geolocation (e.g., global positioning system (GPS) location) of the user device, and then compare the geolocation of the user device to a geolocation of the IAB node to determine a distance. The distance is compared by the carrier management module 336 to a predetermined distance threshold for the particular form of FDD carrier. The carrier management module 336 may determine that the user device is a within range to use the particular form of FDD carrier when the distance is within the predetermined distance threshold.

Thus, since an FDD signal has a greater signal range than a TDD signal, the carrier management module 336 may initially establish a wireless access link with the user device via the FDD carrier as the user device approaches the IAB node. However, as the user device moves closer and comes into range to use a TDD carrier, the carrier management module 336 may switch to using the TDD carrier for the wireless access link. Conversely, as the user device moves farther away and out of the range for the use of a TDD carrier, the carrier management module 336 may once again switch to using the FDD carrier for the wireless access link.

In some embodiments, the carrier management module 336 may be configured to preserve a predetermined amount of the FDD carrier bandwidth for the operations of wireless backhaul links between the IAB node and downstream IAB nodes. Accordingly, the carrier management module 336 may suspend the establishment of any FDD carriers for wireless access links between the IAB node and user devices when an available amount of FDD carrier bandwidth at the IAB node falls below a minimum bandwidth threshold. The suspension of the FDD carrier establishment may remain in place until the carrier management module 336 determines that the available amount of the FDD carrier bandwidth is at or above the minimum bandwidth threshold.

The carrier aggregation module 338 may coordinate the use of multiple carriers by a single user device. The user device may include hardware and/or software components that support the use of FDD and TDD carriers to simultaneously carry uplink and downlink communication traffic. In various embodiments, the carrier aggregation module 338 may be configured to supplement the use of a TDD carrier with an FDD carrier. For example, a user device may be using the TDD carrier as a wireless access link between the user and the IAB node. However, the TDD carrier may provide insufficient data transmission bandwidth for the data throughput between the IAB node and the user device. For example, the IAB node may determine that the TDD carrier is providing insufficient data transmission bandwidth when corresponding data of the user device overflows into an overflow buffer of the IAB node, when a data packet loss of the data for the user device exceeds a predetermined loss threshold at the IAB node, when data transmission latency of the data for the user device exceeds a latency threshold, and/or so forth. In such instances, the IAB node may coordinate the establishment of a new FDD carrier between the user device and an in-range IAB node to provide supplemental data transmission bandwidth.

The in-range IAB node may be a node that is able to provide the highest FDD carrier signal strength to the user device. For example, the in-range IAB node may be the IAB node, the IAB donor node, or a backhaul linked IAB node that is upstream or downstream to the in-range IAB node. In various embodiments, the in-range IAB node that is able to provide the highest FDD carrier signal strength may be an in-range IAB that is receiving a strongest radio signal from the user device or which is closest in distance to the user device.

In some embodiments, the provision of the FDD carrier from an in-range IAB node may be subject to the preservation of a predetermined amount of the FDD carrier bandwidth and prioritization of the allocation of FDD carriers for wireless access links of user devices that are within range but otherwise do not have any wireless access link to an in-range IAB node. Thus, the carrier aggregation module 338 may coordinate for the termination of a supplemental wireless access link in certain situations. For example, when an amount of available FDD carrier bandwidth is below a minimum bandwidth threshold of the in-range IAB node, the termination may free up sufficient FDD carrier bandwidth so that a new FDD carrier may be established between the in-range IAB node and a user device that is within range but otherwise does not have a wireless access link to an in-range IAB node. This means that the carrier aggregation module 338 may use carrier aggregation to establish or maintain the supplemental wireless access link only when there is sufficient FDD carrier bandwidth at the IAB node for supporting at least a portion of the data throughput of the user device, in addition to supporting existing data traffic on a wireless backhaul link to an upstream IAB node or IAB donor node, and if applicable, on the one or more wireless backhaul links to one or more downstream IAB nodes, and on one or more other wireless access links that the IAB node has with one or more other user devices.

In instances in which the in-range IAB node that provides an FDD carrier is an IAB donor node, a downstream IAB, or an upstream IAB node rather than the IAB node itself, the carrier aggregation module 338 of the IAB node may coordinate with carrier aggregation modules of the in-range IAB to set up a supplemental wireless access link. The coordination may be performed in a peer-to-peer manner via control channel communication (e.g., RLC channel) between the nodes. Alternatively, the coordination may be performed by the IAB node in conjunction with a network switching function of a core network. The coordination performed by the carrier aggregation module 338 may further include the synchronization of TDD and FDD carriers to duplex uplink and downlink communication traffic between a user device and one or more IAB nodes. For example, a carrier traffic synchronization algorithm of the carrier aggregation module 338 may work in conjunction with a counterpart synchronization algorithm on a user device, and/or synchronization algorithms of one or more additional IAB nodes to perform the duplexing. While the operations of the modules are described above in the context of the IAB node 304, it will be appreciated that the node software of the example IAB donor node 302 and the example IAB node 306 may function in a similar manner.

Example Processes

Figure 4:
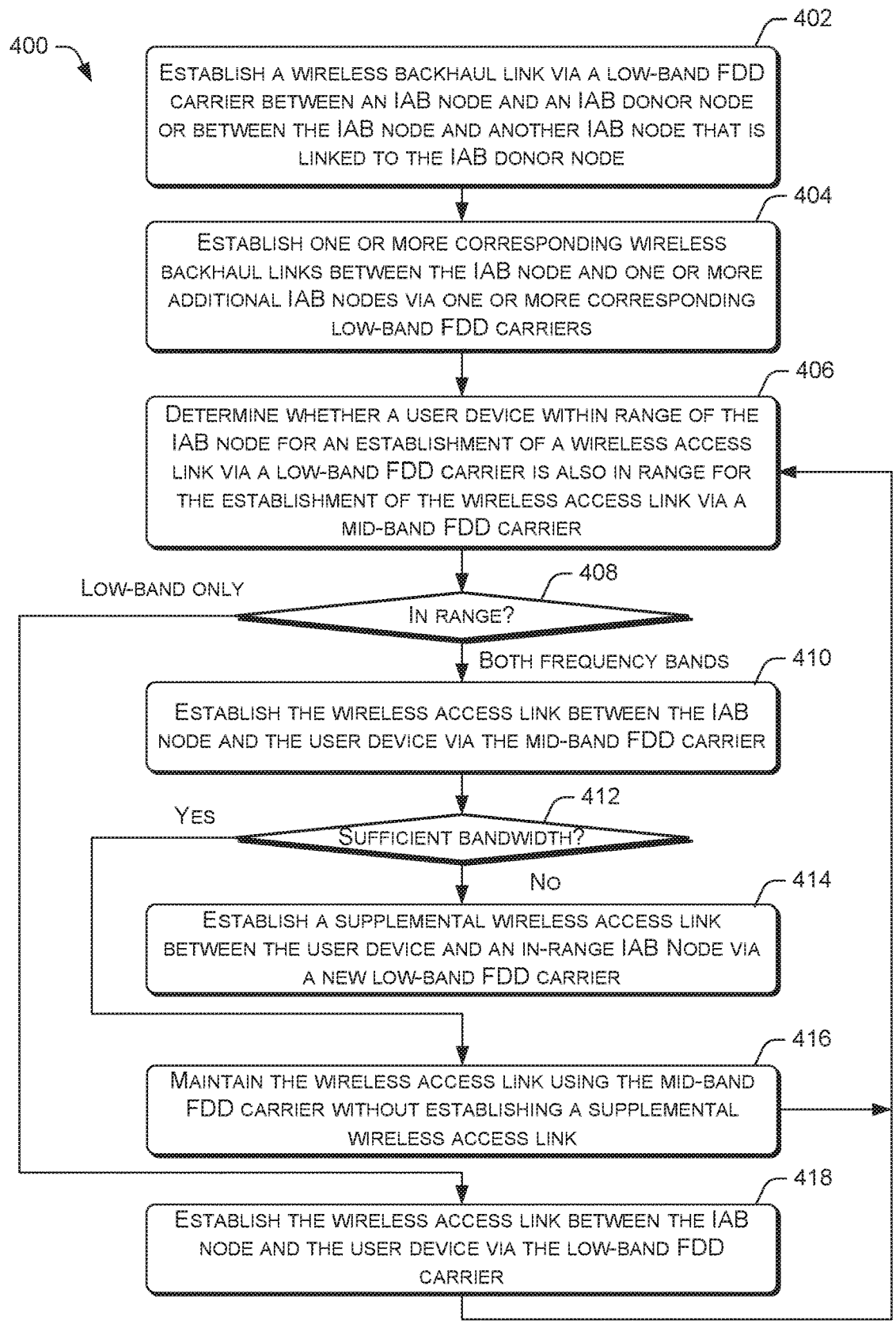
FIG. 4 is a flow diagram of an example process for using FDD carriers of different frequencies to implement wireless backhaul links and wireless access links for an IAB node.
Figure 5:
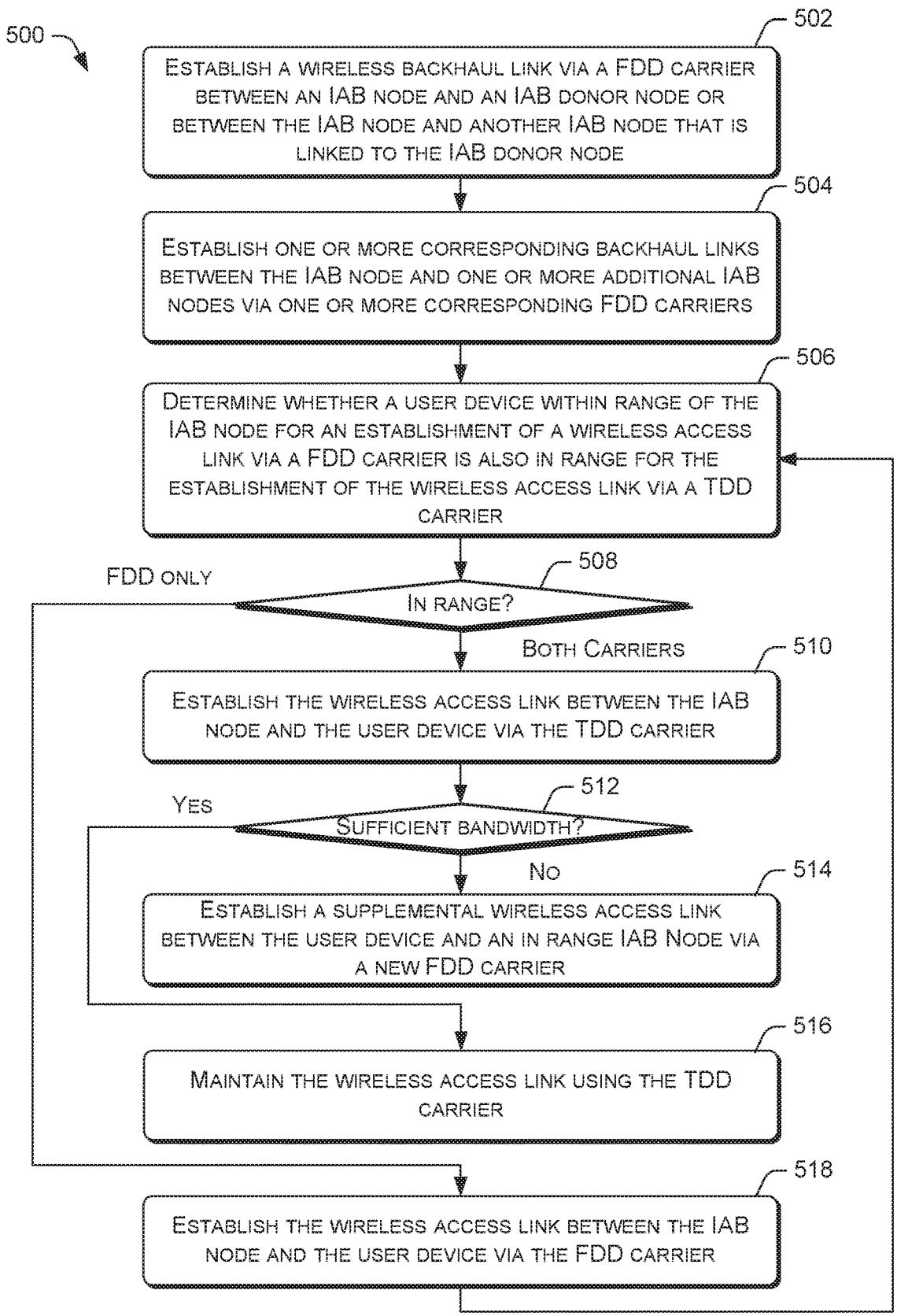
FIG. 5 is a flow diagram of an example process for using a combination of TDD carriers and FDD carriers of different frequency bands to implement wireless backhaul links and wireless access links for an IAB node.

FIGS. 4 and 5 present illustrative processes 400 and 500 for deploying FDD carrier-based IAB coverage. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to the architecture 100 of FIG. 1 and architecture 200 of FIG. 2, respectively.

FIG. 4 is a flow diagram of an example process 400 for using FDD carriers of different frequencies to implement wireless backhaul links and wireless access links for an IAB node. At block 402, an IAB node may establish a wireless backhaul link between the IAB node and the IAB donor node or between the IAB node and another IAB node that is linked to the IAB donor node, in which the wireless backhaul link is established via a low-band FDD carrier. The IAB donor node may have a backhaul, e.g., a fiber optics cable connection, a microwave relay connection, an AAV connection, and/or so forth to a core network of a wireless carrier network.

At block 404, the IAB node may establish one or more corresponding wireless backhaul links between the IAB node and one or more additional IAB nodes via one or more corresponding low-band FDD carriers. Each of the corresponding wireless backhaul links may enable a corresponding IAB node to exchange communication with the core network of the wireless carrier network.

At block 406, the IAB node may determine whether a user device within range of the IAB node for an establishment of a wireless access link via a low-band FDD carrier is also in range for the establishment of the wireless access link via a mid-band FDD carrier. In various embodiments, the low-band FDD carrier may have a greater signal range than the mid-band FDD carrier, and the mid-band FDD carrier may have a greater transmission bandwidth than the low-band FDD carrier.

At decision block 408, if the IAB node determines that the user device is in range to establish both frequency bands, the process 400 may proceed to block 410. At block 410, the IAB node may establish the wireless access link between the IAB node and the user device via the mid-band FDD carrier. In other words, the IAB node may be configured to use the mid-band FDD carrier by default if both frequency bands are available for use.

At decision block 412, the IAB node may determine whether the mid-band FDD carrier is providing sufficient data transmission bandwidth for a data throughput between the IAB node and the user device. Thus, if there is insufficient data transmission bandwidth, the process 400 may proceed to block 414. At block 414, the IAB node may supplement the wireless access link between the user device and the in-range IAB node via a new low-band FDD carrier. In some embodiments, the performance of the operation included in block 414 is subject to the IAB preserving a sufficient amount of low-band FDD carrier bandwidth for the operation of its own wireless backhaul link and wireless backhaul links of all downstream IAB nodes. Thus, the operation included block 414 may be skipped if a sufficient amount of low-band FDD carrier bandwidth cannot be preserved.

However, if there is sufficient data transmission bandwidth at decision block 412, the process 400 may proceed to block 416. At block 416, the IAB node may maintain the wireless access link using the mid-band FDD carrier without establishing a supplemental wireless access link via a new low-band FDD carrier. Returning to decision block 408, if the IAB node determines that the user device is only in range of the low-band FDD carrier, the process 400 may proceed to block 418. At block 418, the IAB node may establish the wireless access link between the IAB node and the user device via the low-band FDD carrier. While the operations included in blocks 406-418 of the process 400 are described as being performed by an IAB node, the IAB donor node may perform similar operations in other embodiments.

FIG. 5 is a flow diagram of an example process 500 for using a combination of TDD carriers and FDD carriers of different frequency bands to implement wireless backhaul links and wireless access links for an IAB node. At block 502, an IAB node may establish a wireless backhaul link between the IAB node and the IAB donor node or between the IAB node and another IAB node that is linked to the IAB donor node, in which the wireless backhaul link is established via an FDD carrier. The IAB donor node may have a backhaul, e.g., a fiber optics cable connection, a microwave relay connection, an AAV connection, and/or so forth to a core network of a wireless carrier network.

At block 504, the IAB node may establish one or more corresponding wireless backhaul links between the IAB node and one or more additional IAB nodes via one or more corresponding FDD carriers. Each of the corresponding wireless backhaul links may enable a corresponding IAB node to exchange communication with the core network of the wireless carrier network.

At block 506, the IAB node may determine whether a user device within range of the IAB node for an establishment of a wireless access link via an FDD carrier is also in range for the establishment of the wireless access link via an FDD carrier. In various embodiments, the FDD carrier may have a greater signal range than the FDD carrier, and the FDD carrier may have a greater transmission bandwidth than the FDD carrier.

At decision block 508, if the IAB node determines that the user device is in range to establish both frequency bands, the process 500 may proceed to block 510. At block 510, the IAB node may establish the wireless access link between the IAB node and the user device via the FDD carrier. In other words, the IAB node may be configured to default to using the FDD carrier if both frequency bands are available for use.

At decision block 512, the IAB node may determine whether the FDD carrier is providing sufficient data transmission bandwidth for a data throughput between the IAB node and the user device. Thus, if there is insufficient data transmission bandwidth, the process 500 may proceed to block 514. At block 514, the IAB node may supplement the wireless access link between the user device and the in-range IAB node via a new FDD carrier. In some embodiments, the performance of the operation included in block 514 is subject to the IAB preserving a sufficient amount of FDD carrier bandwidth for the operation of its own wireless backhaul link and wireless backhaul links of all downstream IAB nodes. Thus, the operation included block 514 may be skipped if a sufficient amount of FDD carrier bandwidth cannot be preserved.

However, if there is sufficient data transmission bandwidth at decision block 512, the process 500 may proceed to block 516. At block 516, the IAB node may maintain the wireless access link using the FDD carrier without establishing a supplemental wireless access link via a new FDD carrier. Returning to decision block 508, if the IAB node determines that the user device is only in range of the FDD carrier, the process 500 may proceed to block 518. At block 518, the IAB node may establish the wireless access link between the IAB node and the user device via the FDD carrier. While the operations included in blocks 506-518 of the process 500 are described as being performed by an IAB node, the IAB donor node may perform similar operations in other embodiments.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of an integrated access and backhaul (IAB) node of a wireless carrier network storing computer-executable instructions that upon execution cause one or more processors to perform acts comprising:

establishing a wireless backhaul link via a low-band frequency division duplex (FDD) carrier between the IAB node and an IAB donor node or between the IAB node and another IAB node that is linked to the IAB donor node, the IAB donor node providing the IAB node with access to a backhaul connection to a core network of the wireless carrier network;

establishing one or more corresponding wireless backhaul links between the IAB node and one or more additional IAB nodes via a one or more corresponding low-band FDD carriers; and in response to determining that a user device is in range of the IAB node for an establishment of a wireless access link via a mid-band FDD carrier, establishing the wireless access link between the IAB node and the user device via the mid-band FDD carrier when there is a predetermined amount of mid-band FDD carrier bandwidth available from the IAB node, wherein the mid-band FDD carrier has a higher signal frequency than the low-band FDD carrier, and the low-band FDD carrier has a longer signal range than the mid-band FDD carrier.

2. The one or more non-transitory computer-readable media of claim 1, wherein the acts further comprise at least in response to determining that the user device is in range of the IAB node for the establishment of the wireless access link via an additional low-band FDD carrier, but not in range of the IAB node for the establishment of the wireless access link via the mid-band FDD carrier, establishing the wireless access link between the IAB node and the user device via the additional low-band FDD carrier.

3. The one or more non-transitory computer-readable media of claim 2, wherein the establishing the wireless access link via the additional low-band FDD carrier includes establishing the wireless access link via the additional low-band FDD carrier when an available amount of low-band FDD carrier bandwidth of the IAB node is at or above a minimum bandwidth threshold.

4. The one or more non-transitory computer-readable media of claim 1, wherein the acts further comprise in response to determining that the mid-band FDD carrier is unable to provide sufficient bandwidth for a data throughput of the user device, establishing a supplemental wireless access link via an additional low-band FDD carrier between the user device and the IAB node, between the user device and the IAB donor node, or between the user device and one of the one or more additional IAB nodes.

5. The one or more non-transitory computer-readable media of claim 4, wherein establishing the supplemental wireless access link includes establishing the supplemental wireless access link when there is sufficient low-band FDD carrier bandwidth at the IAB node for supporting at least a portion of the data throughput of the user device, in addition to supporting existing data traffic on the wireless backhaul link, on the one or more corresponding wireless backhaul links, and on one or more other wireless access links that the IAB node has with one or more other user devices.

6. The one or more non-transitory computer-readable media of claim 4, wherein the acts further comprise in response to determining that an additional user device that lacks any existing wireless access link with the IAB node is in range of the IAB node to establish a new wireless access link via a new low-band FDD carrier but not via a new mid-band FDD carrier, terminating the supplemental wireless access link between the user device and the IAB node and establishing a new wireless access link between the IAB node and the additional user device via the new low-band FDD carrier.

7. The one or more non-transitory computer-readable media of claim 1, wherein the low-band FDD carrier has a radio frequency of 600 MHz, and the mid-band FDD carrier has a radio frequency of 2.1 GHz.

8. A system, comprising:
one or more processors; and
memory including a plurality of computer-executable components that are executable by the one or more processors to perform a plurality of actions, the plurality of actions comprising:

establishing a wireless backhaul link via a frequency division duplex (FDD) carrier between an integrated access and backhaul (IAB) node and an IAB donor node or between the IAB node and another IAB node that is linked to the IAB donor node, the IAB donor node providing the IAB node with access to a backhaul connection to a core network of a wireless carrier network;

establishing one or more corresponding wireless backhaul links between the IAB node and one or more additional IAB nodes via a one or more corresponding FDD carriers; and in response to determining that a user device is in range of the IAB node for an establishment of a wireless access link via a time division duplex (TDD) carrier, establishing the wireless access link between the IAB node and the user device via the TDD carrier;

in response to determining that the user device is in range of the IAB node for the establishment of the wireless access link via a further FDD carrier, but not in range of the IAB node for the establishment of the wireless access link via the TDD carrier, establishing the wireless access link between the IAB node and the user device via the further FDD carrier, wherein the TDD carrier has a higher signal frequency than the FDD carrier or the further FDD carrier, and the FDD carrier or the further FDD carrier has a longer signal range than the TDD carrier.

9. The system of claim 8, wherein the establishing the wireless access link between the IAB node and the user device via the further FDD carrier includes establishing the wireless access link via the further FDD carrier when an available amount of FDD carrier bandwidth of the IAB Node is at or above a minimum bandwidth threshold.

10. The system of claim 8, wherein the actions further comprise, following the establishing the wireless access link via the TDD carrier, in response to determining that the TDD carrier is unable to provide sufficient bandwidth for a data throughput of the user device, establishing a supplemental wireless access link via an additional FDD carrier between the user device and the IAB node, between the user device and the IAB donor node, or between the user device and one of the one or more additional IAB nodes.

11. The system of claim 10, wherein establishing the supplemental wireless access link includes establishing the supplemental wireless access link when there is sufficient FDD carrier bandwidth at the IAB node for supporting at least a portion of the data throughput of the user device, in addition to supporting existing data traffic on the wireless backhaul link, on the one or more corresponding wireless backhaul links, and on one or more other wireless access links that the IAB node has with one or more other user devices.

12. The system of claim 10, wherein the actions further comprise in response to determining that an additional user device that lacks any existing wireless access link with the IAB node is in range of the IAB node to establish a new wireless access link via a new FDD carrier but not via a new TDD carrier, terminating the supplemental wireless access link between the user device and the IAB node and establishing a new wireless access link between the IAB node and the additional user device via the new FDD carrier.

13. The system of claim 8, wherein the FDD carrier has a radio frequency of 600 MHz or 2.1 GHz, and the TDD carrier has a radio frequency of 2.5 GHz.

14. A computer-implemented method, comprising:
 establishing a wireless backhaul link via a low-band frequency division duplex (FDD) carrier between an integrated access and backhaul (IAB) node and an IAB donor node or between the IAB node and another IAB node that is linked to the IAB donor node, the IAB donor node providing the IAB node with access to a backhaul connection to a core network of a wireless carrier network;
 establishing one or more corresponding wireless backhaul links between the IAB node and one or more additional IAB nodes via a one or more corresponding low-band FDD carriers; and
 in response to determining, at the IAB node, that a user device is in range of the IAB node for an establishment of a wireless access link via a mid-band FDD carrier, establishing the wireless access link between the IAB node and the user device via the mid-band FDD carrier;
 in response to determining that the user device is in range of the IAB node for the establishment of the wireless access link via a new low-band FDD carrier, but not in range of the IAB node for the establishment of the wireless access link via the mid-band FDD carrier, establishing the wireless access link between the IAB node and the user device via the new low-band FDD carrier,
 wherein the mid-band FDD carrier has a higher signal frequency than the low-band FDD carrier or the new low-band FDD carrier, and the low-band FDD carrier or the new low-band FDD carrier has a longer signal range than the mid-band FDD carrier.

15. The computer-implemented method of claim 14, further comprising, following the establishing the wireless access link via the mid-band FDD carrier, in response to determining that the mid-band FDD carrier is unable to provide sufficient bandwidth for a data throughput of the user device, establishing a supplemental wireless access link via an additional low-band FDD carrier between the user device and the IAB node, between the user device and the IAB donor node, or between the user device and one of the one or more additional IAB nodes.

16. The computer-implemented method of claim 15, further comprising in response to determining that an additional user device that lacks any existing wireless access link with the IAB node is in range of the IAB node to establish a new wireless access link via a new low-band FDD carrier but not via a new mid-band FDD carrier, terminating the supplemental wireless access link between the user device and the IAB node and establishing a new wireless access link between the IAB node and the additional user device via the new low-band FDD carrier.

17. The computer-implemented method of claim 14, wherein the establishing the wireless access link via the new low-band FDD carrier includes establishing the wireless access link via the new low-band FDD carrier when an available amount of low-band FDD carrier bandwidth of the IAB node is at or above a minimum bandwidth threshold.

18. The computer-implemented method of claim 14, wherein the low-band FDD carrier or the new low-band FDD carrier has a radio frequency of 600 MHz.

19. The computer-implemented method of claim 14, wherein the mid-band FDD carrier has a radio frequency of 2.1 GHz.

\* \* \* \* \*